UNITED STATES PATENT OFFICE.

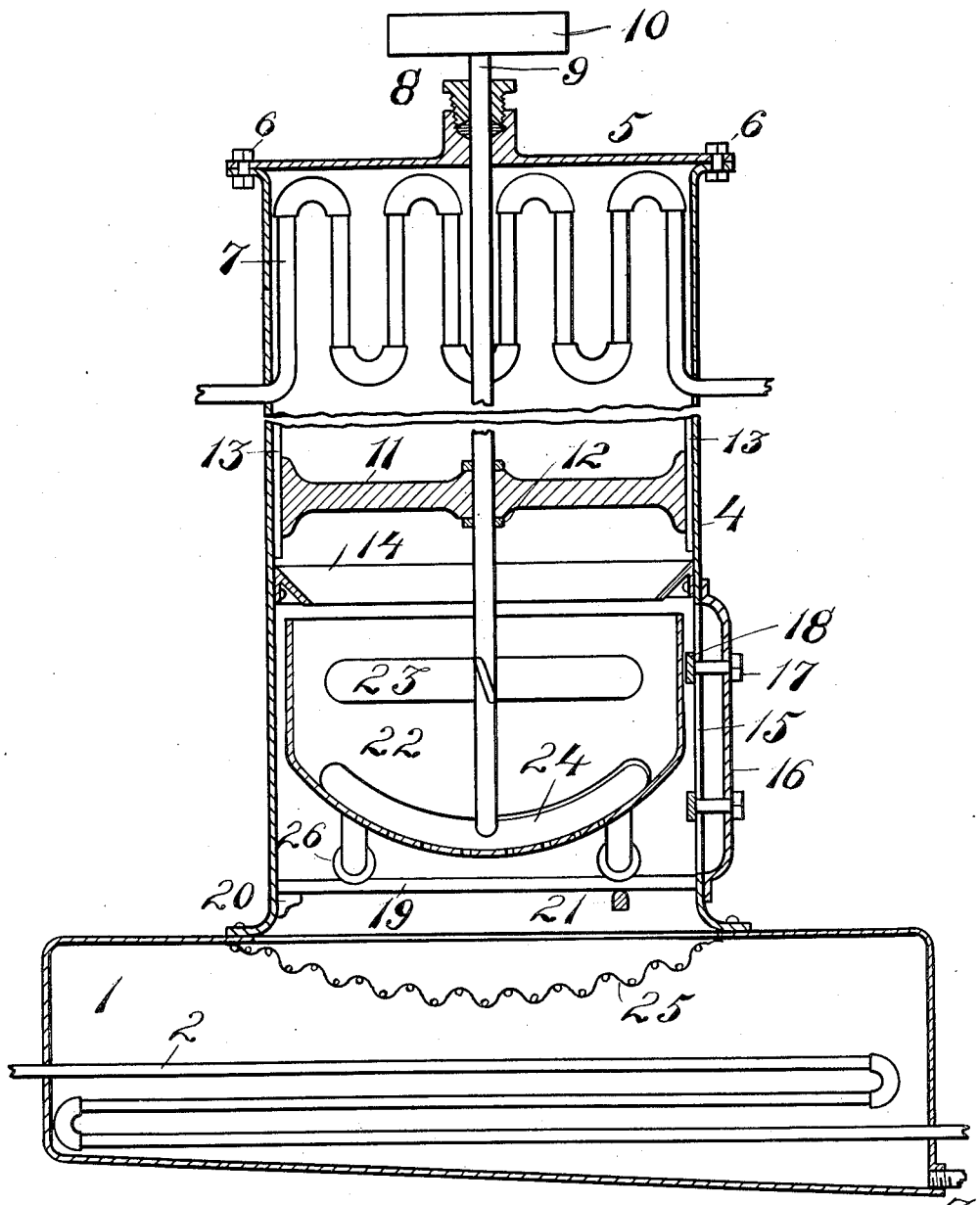

ARCHIE P EVES, OF AKRON, OHIO.

PROCESS OF TREATING GUM.

No. 821,934.   Specification of Letters Patent.   Patented May 29, 1906.

Application filed April 14, 1905. Serial No. 255,590.

*To all whom it may concern:*

Be it known that I, ARCHIE P. EVES, a citizen of the United States, residing at Akron, in the county of Summit and State of Ohio, have invented new and useful Improvements in Processes of Treating Gum, of which the following is a specification.

My invention relates to methods for treating crude gums used in the manufacture of rubber to enhance their value either by removing therefrom certain deleterious substances or altering certain of their essential parts, or both.

The objects of my invention are primarily to enhance the value of crude gum for commercial uses by so treating it that high-grade gum, such as "Para," will be increased in value and inferior gum, such as "Pontianiac," which is a gum of comparatively low degree of resiliency and tenacity and is commonly used as a filler to be mixed with high-grade gums, may be so changed in its elements as to be relatively of much more value.

Gums used in manufacturing rubber, as it is well known, are the product of coagulation of milky juices (emulsions) of various trees, creepers, and shrubs, and therefore rarely, if ever, homogeneous and chemically pure. Experiments demonstrate that they contain water, sand, vegetable fibers, wood, and other impurities, which may be removed by washing and drying *in vacuo*, resulting in approximately technically pure gum. The washing of the gum, however, also removes certain carbohydrate, which in many cases are essential to the life of rubber. Experience has also shown that inferior gums contain resin in large quantities, and even high-grade gums, such as Para, contain from two to five per cent., and as these resins are foreign to the composition of strictly first-class rubber their removal becomes a step toward improvement in the quality of rubber. It has also been found that milks in low-grade gums are improperly coagulated.

I have found by experience that a treatment of crude gums with the alcohols and their derivatives, of which the best for the purpose is acetone, $(CH_3)CO_2$, will remove the resins by uniting with them, and it has been found that after this treatment the milks and carbohydrates change into good gum, so that the result is a good gum of much higher degree commercially and chemically than previous to this treatment. In carrying out this process I make use of certain mechanical devices for the handling of the gum and the applying thereto of the desired liquid, and the device which I have found to be the best for this purpose is illustrated in the accompanying drawing, which represents a vertical central section of the entire device, it being understood that changes, variations, and modifications can be resorted to which might perhaps better aid in the carrying out of this process without in any manner departing from this invention.

In the drawings 1 represents a large and relatively shallow tank, in the base portion of which is a pipe-coil 2, into which is introduced some heating medium, such as steam. The tank 1 is provided with a drain-pipe 3 at one of its lower corners for a purpose to be described. Mounted upon the tank 1 is a secondary tank 4, which may be of sheet metal, the same as tank 1. The upper portion of this tank 4 is closed by a head 5, united thereto preferably by bolts 6. In the upper portion of this secondary tank 4 is a pipe-coil 7, through which is constantly passed a cooling fluid. The head 5 on the secondary tank 4 is provided centrally with a stuffing-box 8, through which extends vertically a rotatable shaft 9, having on its upper end a pulley 10, over which is passed a belt from a convenient source of power for the purpose of rotating the shaft 9. The shaft 9 passes downwardly approximately centrally of the secondary tank 4 and is supported in its medial portions by a spider 11. This spider 11 is held between two collars 12, which are tight on the shaft 9, so that any vertical movement of the shaft 9 will raise the spider 11. The outer ends of the legs of the spider 11 are grooved so as to straddle and coöperate with vertically-placed ridges 13, on the inner face of the secondary tank 4. Below the spider 11 is fastened a deflecting-ring 14, whose use and purpose will be described later. In the wall of the secondary tank 4, immediately above the point where it rests upon the tank 1, is an opening 15, closed by a cover 16, held by bolts 17, which engage cross-bars 18, extending across the opening 15. From this opening 15 there extends across the interior of the secondary tank 4 a track consisting of a pair of rails, one of which, 19, is shown in the drawing. The ends of this track may be supported on brackets 20 and the opposite ends by a cross-bar 21. This track is used for the sustaining of a kettle or crucible 22, with wheels 26, and having a perforated shell into which the rubber to be treated is placed, and the opening 15 is used to withdraw the kettle or crucible from within the secondary tank 4 whenever it is desired. The shaft 9 extends into the kettle 22 and bears on its lower end a pair of agitator-blades 23 and 24, the blades 24 being so placed as to act as scrapers to raise the sticky mass of gum from the bottom surface of the kettle 22 and to constantly tend to keep that portion of the mass from the bottom and work it upward to the end that it may be thoroughly combined with the liquid with which it is to be treated.

In practice I prefer to suspend below the kettle a wire-fabric bag or screen 25, for a purpose to be later described. In using the apparatus just described the shaft 9 is raised vertically, which is permitted by the fact that the spider 11 is vertically movable in unison therewith, until the agitator-blades 23 and 24 are above the opening 15, and the cap 16 being removed the kettle substantially filled with the gum to be treated by this process is run in on the rails 19 until it stands substantially in the positon shown in the drawing. The shaft 9 bearing the agitator-blades is then lowered and the cover 16 placed over the opening 15 and secured tightly in position, the tank 1 is partly filled with one of the alcohols or its derivatives, and steam or some other equally efficient heat-producing medium is passed through the pipe-coil 2, and the temperature of the liquid is raised to the boiling-point. At this point the liquid commences to volatilize and passes up around the kettle 22 and between the kettle 22 and the deflecting-ring 14, past the spider 11, until it encounters the pipe-coil 7. This pipe-coil 7 is kept constantly cold by a current of cooling fluid which condenses the volatilized liquid and which in turn drips in a liquid form chemically pure into the mass of gum in the kettle 22. This dripping of the liquid into the kettle 22 is assisted and guided in its descent by the deflecting-ring 14. In the meantime the agitator-blades and the shaft 9 are kept in constant motion, which thoroughly incorporates the liquid with the gum in the kettle 22, during which time the chemical action takes place and the liquid mingles and unites with the resins of the gum, forming therewith a solution, and the gum itself assumes a stiff tenacious consistency. As rapidly as the liquid unites with the resin it drips through the perforations in the base of the kettle 22 and through the screen 25 into the tank 1. After this has been kept up sufficiently long to remove the resins from the gum the rotation of the shaft 9 is stopped and the shaft 9 raised, the cover 16 removed, and the kettle of purified gum removed through the opening 15. The liquid in the tank, which by this time contains more or less resin, is withdrawn through the drain-pipe 3 to be later subjected to distillation to separate the resin therefrom. The screen of wire fabric 25 is placed below the kettle 22 to catch any masses of rubber which might fall therefrom. The action of the liquid upon the gum removes the resins and other deleterious substances therefrom, and it is found that after the process the milks are properly coagulated and the uncombined carbohydrates in the gum are converted into good gum, thereby adding an additional value to the gum instead of washing them out with water, as is the common practice, which injures the quality thereof.

It will be obvious, of course, that the pipe-coils may be constructed in any form desired, as well as the kettle and agitator-blades, so long as they accomplish equally efficient results, and the other parts of the device may be changed to suit the particular use to which they may be put.

This process just described produces from an inferior grade of crude gum a gum of much higher degree of commercial value, as well as chemical purity, and greatly enhances the value thereof, which is particularly a desirable feature at the present time, owing to the extremely high price of what are known as the "high-grade" gums, such as Para, the cost of which is so great as to make its use of very limited extent indeed compared with the use of the inferior gums.

What I claim, and desire to secure by Letters Patent, is—

1. A process of refining gum used in the manufacture of rubber comprising heating the material by the action of solvent vapors, and then condensing said vapors and allowing the products of condensation to mingle with the heated material, thereby freeing the mass from deleterious substances.

2. A process of refining gum used in the manufacture of rubber comprising heating the material by alcoholic vapors, and then condensing said vapors and allowing the products of condensation to mingle with the heated material, thereby freeing the mass from deleterious substances.

3. A process of refining gum used in the manufacture of rubber comprising heating the material by alcoholic vapors while said material is in the state of agitation, and then condensing said vapors and allowing the products of condensation to mingle with the heated material, thereby freeing the mass from deleterious substances.

4. A method of purifying gum used in the manufacture of rubber which consists in passing solvent vapors upward and through and around the material to be treated and to a condenser, and at the same time causing the condensed solvent to descend through the rising vapor upon the gum, whereby the heat of the vapor is utilized and the solvent and gum made to undergo treatment at as high a temperature as is practicable.

5. A method of purifying rubber which consists in passing alcoholic vapors through and around the material to be treated to a condenser, and at the same time causing the condensed solvent to descend through the rising vapor upon the gum, whereby the heat of the vapor is utilized and the solvent and gum made to undergo treatment at as high a temperature as is practicable.

6. A process of refining rubber comprising the heating by solvent vapors of the material to be treated while the material is in the state of agitation, and then condensing said vapors and allowing the products of condensation to mingle with the heated material, thereby freeing the mass from deleterious substances.

In testimony whereof I have hereunto set my hand in presence of two subscribing witnesses.

ARCHIE P. EVES.

Witnesses:
  C. E. HUMPHREY,
  GLENARA FOX.